(12) United States Patent
Merrill

(10) Patent No.: US 12,384,969 B2
(45) Date of Patent: *Aug. 12, 2025

(54) ENHANCEMENT OF SOIL CHARACTERISTICS WITH LACTOBIONATE COMPOUNDS

(71) Applicant: Leprino Foods Company, Denver, CO (US)

(72) Inventor: Richard K. Merrill, Denver, CO (US)

(73) Assignee: Leprino Foods Company, Denver, CO (US)

( * ) Notice: Subject to any disclaimer, the term of this patent is extended or adjusted under 35 U.S.C. 154(b) by 159 days.

This patent is subject to a terminal disclaimer.

(21) Appl. No.: 16/737,540

(22) Filed: Jan. 8, 2020

(65) Prior Publication Data

US 2020/0140756 A1    May 7, 2020

Related U.S. Application Data

(63) Continuation-in-part of application No. 16/030,473, filed on Jul. 9, 2018, now Pat. No. 11,802,241.

(60) Provisional application No. 62/530,402, filed on Jul. 10, 2017.

(51) Int. Cl.
| | |
|---|---|
| C09K 17/14 | (2006.01) |
| C05C 3/00 | (2006.01) |
| C05C 5/00 | (2006.01) |
| C05C 9/00 | (2006.01) |
| C05G 3/80 | (2020.01) |

(52) U.S. Cl.
CPC ............ *C09K 17/14* (2013.01); *C05C 3/00* (2013.01); *C05C 5/00* (2013.01); *C05C 9/00* (2013.01); *C05G 3/80* (2020.02)

(58) Field of Classification Search
CPC .. C09K 17/14; C05G 3/80; C05C 3/00; C05C 5/00; C05C 9/00
See application file for complete search history.

(56) References Cited

U.S. PATENT DOCUMENTS

| | | | |
|---|---|---|---|
| 2,746,916 A ‡ | 5/1956 | Magariello | C07C 59/105 |
| | | | 205/42 |
| 5,868,087 A | 2/1999 | Salestrom | |
| 6,672,001 B1 | 1/2004 | Ali et al. | |
| 6,857,225 B2 | 2/2005 | Petrea et al. | |
| 6,916,496 B2 ‡ | 7/2005 | Koka | A23C 9/1213 |
| | | | 426/39 |
| 7,811,353 B2 * | 10/2010 | Blais | A01N 63/00 |
| | | | 71/6 |
| 9,309,462 B1 | 4/2016 | Curtis et al. | |
| 2004/0134248 A1 | 7/2004 | Smith et al. | |
| 2007/0105200 A1 * | 5/2007 | Budtz | A23L 27/82 |
| | | | 435/104 |
| 2007/0154595 A1 ‡ | 7/2007 | Budtz | A23C 9/1213 |
| | | | 426/34 |
| 2008/0271368 A1 * | 11/2008 | Yamada | C05B 17/00 |
| | | | 47/57.6 |
| 2016/0198621 A1 ‡ | 7/2016 | Ohlund | A01G 9/0291 |
| | | | 47/19 |
| 2017/0112605 A1 ‡ | 4/2017 | Roh | A61D 7/04 |
| 2019/0010399 A1 * | 1/2019 | Merrill | B01J 20/223 |

FOREIGN PATENT DOCUMENTS

| | | | | |
|---|---|---|---|---|
| CN | 104335819 A | * | 2/2015 | ............... A01G 1/04 |
| CN | 105110857 A | * | 12/2015 | |
| JP | 2005052043 A | | 3/2005 | |
| WO | WO-2005026080 A1 | * | 3/2005 | ............... C05D 9/02 |
| WO | WO-2013191159 A1 | * | 12/2013 | ............... C05F 11/00 |
| WO | WO-2017112605 A1 | ‡ | 6/2017 | |

OTHER PUBLICATIONS

Sharratt, Warren James, A. E. Peterson, and H. E. Calbert. "Whey as a source of plant nutrients and its effect on the soil." Journal of Dairy Science 42.7 (1959): 1126-1131. (Year: 1959).*
Nieder, Rolf, Dinesh K. Benbi, and Heinrich W. Scherer. "Fixation and defixation of ammonium in soils: a review." Biology and fertility of Soils 47.1 (2011): 1-14. (Year: 2011).*
Lehrsch, G. A., C. W. Robbins, and C. L. Hansen. "Cottage cheese (acid) whey effects on sodic soil aggregate stability." Arid Land Research and Management 8.1 (1994): 19-31. (Year: 1994).*
Sharratt et al. Agronomy Journal 54.4 (1962): 359-36 (Year: 1962).*
Gullickson, G. Here's why the carbon-nitrogen ratio matters, Mar. 15, 2015 [online], [retrieved on Aug. 26, 2020], retrieved from the Internet <URL: https://www.agriculture.com/crops/cover-crops/heres-why-carbonnitrogen-ratio-matters_568-ar48014> (Year: 2015).*
Demirer et al., Journal of Agriculture and Rural Development in the Tropics and Subtropics (JARTS) 106.1 (2005): 71-77. (Year: 2005).*
Maguire et al., "Fertilizer types and calculating application rates." (2009). (Year: 2009).*
Fischer, K., Bipp, HP. Removal of Heavy Metals from Soil Components and Soils by Natural Chelating Agents. Part II. Soil Extraction by Sugar Acids. Water, Air, & Soil Pollution 138, 271-288 (2002). (Year: 2002).*

(Continued)

*Primary Examiner* — Alton N Pryor
(74) *Attorney, Agent, or Firm* — Kilpatrick Townsend & Stockton LLP

(57) ABSTRACT

Methods of extending a period of increased soil nitrogen levels in a soil are described. The methods include applying a soil enhancement agent to the soil, where the soil enhancement agent may include one or both of (i) lactobionic acid, and (ii) a least one salt of lactobionic acid. The methods also include applying a nitrogen-containing fertilizer to the soil. The soil treated with both the soil enhancement agent and the nitrogen-containing fertilizer has a higher level of soil nitrogen for at least a portion of a grown cycle of a crop planted in the soil than the same soil treated without the soil enhancement agent during the growing cycle of the crop.

20 Claims, 6 Drawing Sheets

(56) References Cited

OTHER PUBLICATIONS

Strik, B. "Growing Table Grapes" web page <https://catalog.extension.oregonstate.edu/ec1639/html>, May 2011, retrieved on Feb. 7, 2022. (Year: 2011).*

Morefield et al. U.S. Army Corrosion Summit 2010, webpage <https://apps.dtic.mil/sti/pdfs/ADA532625.pdf>, retrieved on Feb. 1, 2022. (Year: 2010).*

Wells, Kenneth, When to Apply Lime And Fertilizer, University of Kentucky, College of Agriculture, Cooperative Extension Service, Available online at URL: http://www.worldcat.org/title/when-to-apply-lime-and- fertilizer/oclc/45494448 4 pages, 1984.‡

PCT/US2018/040364 received an International Search Report and Written Opinion mailed Sep. 27, 2018, 11 pages.‡

Warrence, et al., "Basics of Salinity and Sodicity Effects on Soil Physical Properties" Department of Land Resources and Environmental Sciences, Montana State University, pp. 1-29, , 2002.‡

Jones, et al., "Sodic Soil Reclamation Using Cottage Cheese (Acid) Whey", Arid Soil Research and Rehabilitation, vol. 7, pp. 51-56, accepted Sep. 11, 1992, Published 1993.

Landschoot, P., "What is an "Acre Furrow Slice" of Soil?" Penn State Extention, Nov. 10, 2016 [online], [retrieved on Jun. 17, 2020], retrieved from the Internet <URL: https://extension .psu . edu/what-is-an-acre-furrow-slice-of-soil > (Year: 2016), 2 pages.

Malone, et al., "Limitin Corrosion Problems Related to Dust-Control Agents", Material Performance, Feb. 2014; 53,2, ProQuest, pp. 50-56.

Stone, et al., "Effect of Organic Amendments on Soilborne and Foliar Diseases in Field-Grown Snap Bean and Cucumber", Plant Disease, vol. 87, No. 9, pp. 1037-1042, Sep. 2003.

U.S. Appl. No. 16/030,473 received a Non-final Office Action mailed Jun. 29, 2020, 20 pages.

Wells, Kenneth, When to Apply Lime And Fertilizer, University of Kentucky, College of Agriculture, Cooperative Extension Service, Available online at URL: http://www.worldcatorg/title/when-to-apply-lime-andfertilizer/ocic/45494448 4 pages, 1984.

U.S. Appl. No. 16/030,473 received a Non-Final Office Action, mailed May 26, 2021, 19 pages.

\* cited by examiner
‡ imported from a related application

ENHANCEMENT OF SOIL CHARACTERISTICS WITH LACTOBIONATE COMPOUNDS

CROSS-REFERENCE TO RELATED APPLICATIONS

This application is a continuation-in-part of U.S. application Ser. No. 16/030,473 filed on Jul. 9, 2018, which claims the benefit of U.S. Application Ser. No. 62/530,402 filed on Jul. 10, 2017. The entire disclosures of both applications are hereby incorporated by reference for all purposes.

BACKGROUND OF THE INVENTION

Crop yields are correlated with the amount of organic matter in the growing soil. Areas that have highly variable quantities of soil organic matter, generally have more variability in crop yields. Moreover, there is often a feedback loop between the soil organic matter content of a soil and crop yield where the higher crop yields leave more residual organic matter for the soil. The importance of soil organic matter to increasing crop yield has spurred efforts to develop methods to sustain and increase the levels of organic matter in soils used for crop production.

A conventional method for increasing soil organic matter is to apply external sources of organic matter to the soil before the start of a new growing season. These external sources include manure, composted plant and animal waste, and fertilizer. While these sources have well demonstrated effects on increasing soil organic matter, they can also have adverse environmental and health impacts if not applied under carefully controlled conditions. For example, inorganic fertilizers concentrated in nitrogen, phosphorous and sulfur can more readily leach out of soils with poor soil organic content into surrounding water. This can create undesirable environmental pollution and disruption of local plant and animal ecosystems.

Some farmers and growers have also been reducing or eliminating the amount of soil tillage they do between growing seasons. There is evidence that no-till soils retain significantly more soil organic matter than soils regularly tilled between growing seasons. The no-till soils have higher crop yields that are attributed to the higher soil organic contents in these soils compared to the tilled soils. The most effective no-till processes use soils that have already undergone regular planting and harvesting. Thus, soils that have not been previously used for growing and harvesting crops, and soils that have experienced changes in environmental conditions that have reduced the yield of crops may show less gain from no-till soil practices.

Additional efforts are underway to study and influence the microbial ecosystems in soils to increase levels of organic matter in the soil. These efforts include the application of compounds to the soil that stimulate the growth of microorganisms that help convert organic nutrients into forms that last longer in the soil. For example, these compounds stimulate the grown of microorganisms that convert simple organic compounds in the soils into more complex organic residues that can remain in the soil as organic matter for more growing seasons. The more complex residues are also believed to increase the ability of the soil to retain moisture, which is another determinant of the soil's crop yield. While efforts to stimulate microorganism growth in soils have shown improvement in crop yield in some instances, there is still a lot of unpredictability with this approach and more studies are needed. Thus, there is a need for additional methods and materials to enhance soil characteristics for enhanced soil water retention, soil microbiology, and potentially crop yields.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral and follows a hyphen to denote one of multiple similar components. When reference is made to a reference numeral without specification to an existing sublabel, it is intended to refer to all such multiple similar components.

BRIEF SUMMARY OF THE INVENTION

Figure 1:
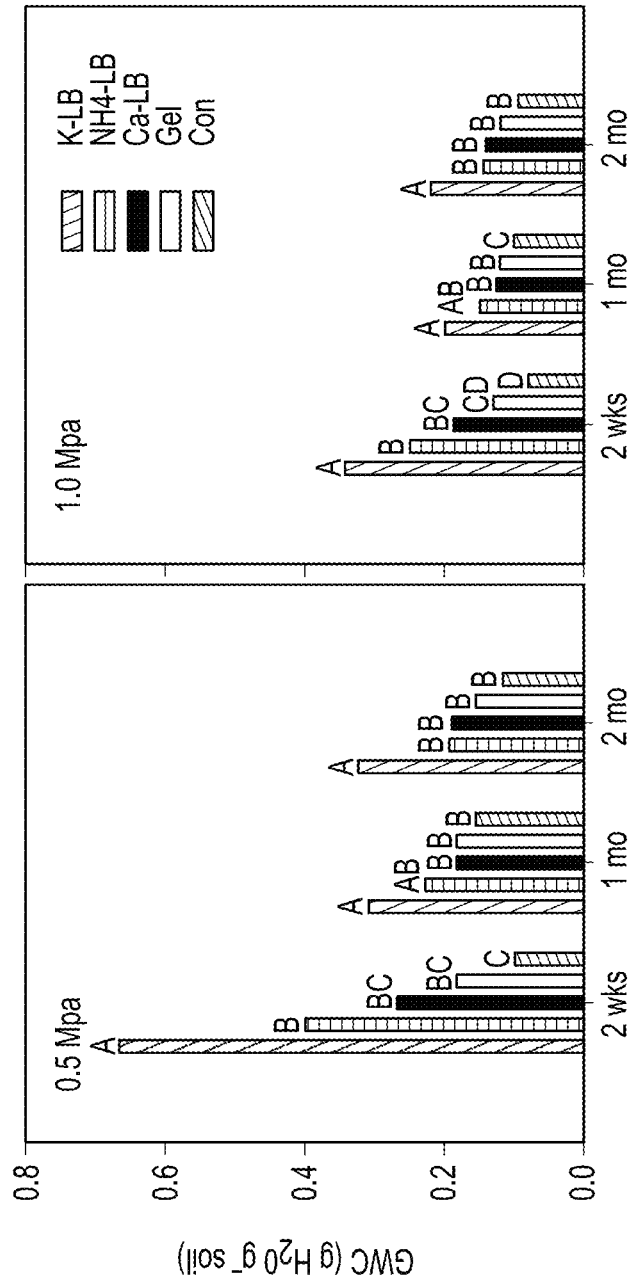
FIG. 1 shows graphs of gravimetric soil water content (GWC) over a period of 2 weeks to 2 months following the additions of varying concentrations of soil enhancement agents.

Crop yields and the overall production capacity of soils are regulated by the amount of water that the soil can hold, especially in regions where water is limited. The ability of a soil to retain water is in part a function of the soil structure and texture but is also influenced by soil organic matter and carbon content. Increasing the water content in the soil helps build healthy soils. Government agencies worldwide are instituting an increasing number of initiatives that encourage land managers to emphasize practices that lead to increased water content in soil.

Improving agricultural soils by increasing their water content starts with the increasing the soil's ability to retain water. The present methods and soils have been developed for the application of one or both of (i) lactobionic acid and (ii) at least one salt of lactobionic acid to the soil. The lactobionic acid-based soil enhancement agents can improve the soil in multiple ways, including (i) aggregating (i.e., flocculating) the soil particles into larger clumps, clusters, etc., and (ii) creating a food source for soil microbes. The aggregation of soil particles such as clays, sands, and silts into larger aggregates alters the soil structure and texture to increase water retention (i.e., water retention) and give the treated soil the potential for a higher gravimetric soil water content (GWC). The availability of the lactobionate ion as a food source for soil microorganisms can also create conditions for increasing microbial biomass content (MBC) of the soil, which in turn increases the overall soil organic matter (SOM) and soil organic carbon (SOC) content.

The increased microbial biomass content in the soil can also regulate the level of soil nitrogen available as a crop nutrient over an extended period. Soil nitrogen, which may take the form of nitrate and ammonium compounds among other nitrogen-containing compounds, is a significant nutrient affecting crop productivity. Soil nitrogen deficiencies can be addressed by adding nitrogen-containing fertilizers to soil. In many instances, the addition of the fertilizer temporarily increases the level of soil nitrogen to boost crop productivity but fails to sustain the increased level over the entire growth period of the crop. If well-timed additions of nitrogen-containing fertilizer are not performed, the overall productivity of the crop may be decreased because of decreased levels of soil nitrogen.

The present methods and soils can extend the period over which increased soil nitrogen levels are available to a crop. This may be accomplished by increasing the microbial biomass content of the soil through the application of one or both of (i) lactobionic acid and (ii) at least one salt of lactobionic acid to the soil. The microbial biomass consumes more free soil nitrogen during a growth phase and releases at least a portion of the consumed nitrogen in a subsequent death and decay phase. The release of the microbially-consumed nitrogen back to the soil during the death and decay phase extends the period over which the soil maintains an increased soil nitrogen level, and reduces (and in some cases eliminates) the need for additional nitrogen-containing fertilizer during the growth cycle of a crop absorbing the soil nitrogen.

The lactobionic acid and salts thereof may be derived from lactose obtained directly or indirectly from milk. Indirect derivation may include sourcing the lactose from a byproduct of a food production process such as cheesemaking. These processes typically start with a source of dairy milk that is converted into, whey, milk permeate (e.g., delactose permeate), cheese or other dairy-derived compound. A by-product in many of these processes is the milk carbohydrates (primarily lactose) found in the dairy milk. The lactose may be converted into lactobionic acid through chemical and/or enzymatic oxidation. The lactobionic acid may be converted into a lactobionate salt by mixing the acid with a base that forms the salt. For example, mixing the lactobionic acid with potassium and/or calcium hydroxide will form potassium lactobionate and calcium lactobionate salts, respectively. In another example, the lactobionic acid is mixed with ammonium hydroxide to form ammonium lactobionate. The lactobionate salts may then be added to the soil as a powder or aqueous solution, or become part of a larger soil enhancement product that is added to the soil.

Embodiments include methods of increasing soil water content using a soil enhancement agent. The methods include applying the soil enhancement agent to a soil. The soil enhancement agent includes one or both of (i) lactobionic acid and (ii) at least one salt of lactobionic acid (i.e., a lactobionate salt).

Embodiments further include method of increasing soil water content by using two or more separate applications of a soil enhancement agent. The methods include applying a first amount of the soil enhancement agent to a soil to make a treated soil. The soil enhancement agent includes one or both of (i) lactobionic acid and (ii) at least one salt of lactobionic acid. Crops are then planted and harvested from the treated soil, leaving behind a harvested soil. A second amount of the soil enhancement agent is applied to the harvested soil. The second amount of soil enhancement agent has a greater concentration of one or both of (i) the lactobionic acid and (ii) at least one salt of lactobionic acid than the first amount of soil enhancement agent.

Embodiments still further include treated soil that has increased soil water content compared to untreated soil. The treated soil may include soil particles (e.g., clay particles) and a soil enhancement agent that has been absorbed into the soil. The soil enhancement agent may include at least one salt of lactobionic acid, and the salt has one or more cations that aggregate at least a portion of the particles in the treated soil.

Embodiments also further include methods of extending a period of increased soil nitrogen levels by incorporating a soil enhancement agent into a soil, and also incorporating a nitrogen-containing fertilizer into the soil. The soil enhancement agent includes one or both of (i) lactobionic acid and (ii) at least one salt of lactobionic acid (i.e., a lactobionate salt). The soil treated with the soil enhancement agent and the nitrogen-containing fertilizer has a higher level of soil nitrogen for at least a portion of the growing cycle of a crop planted in the soil than the same soil treated without the soil enhancement agent during the growing cycle of the crop. In some instances, the soil enhancement agent and the nitrogen-containing fertilizer may be premixed and adding together to the soil. In additional instances, the soil enhancement agent and the nitrogen-containing fertilizer are added separately to the soil.

Additional embodiments and features are set forth in part in the description that follows, and in part will become apparent to those skilled in the art upon examination of the specification or may be learned by the practice of the invention. The features and advantages of the invention may be realized and attained by means of the instrumentalities, combinations, and methods described in the specification.

DETAILED DESCRIPTION OF THE INVENTION

Agricultural systems and crop yields are often limited by the soil water supply, especially in regions such as drought-prone California, the Central Great Plains, and other areas of the world where irrigation is uncommon and precipitation is sparse and erratic. Agricultural systems that are limited by soil moisture are not only vulnerable to reduced crop yields and disease but are often characterized by low concentrations of soil organic matter (SOM) and soil organic carbon (SOC). Crop productivity and healthy soils hinge on a soil's water content, which is affected by the amount of SOM, and the carbon and plant nutrients within it.

Soils with higher SOM concentrations typically have better soil structure that facilitates plant root growth and reduces erosion and are better able to retain water and provide essential crop nutrients. Moreover, the accumulation of SOC mitigates increasing atmospheric carbon dioxide $CO_2$ (an important greenhouse gas) by storing carbon below ground. However, when a soil's water retention is limiting, plant productivity often declines and thus less plant materials are returned to the soil. Given that plant inputs are an important source of SOC, depleted soil carbon stocks often follow soil water limitations. A negative feedback loop can develop as decreased water content in the soil leads to fewer crops and a further depletion in the SOC levels of the soil. This can exacerbate problems for the soil, especially in the water-limited environments of many growing regions.

Increasing the amount of organic inputs, such as leftover crop materials or manure, to the soil is a promising approach for improving both a soil's water content and SOC concentrations. Yet many growers are limited by the amount of available crop materials and too much manure can have unwanted environmental consequences. In part a response to reducing food waste, there has been growing interest in the application of food and industrial byproducts as a potential soil amendment for plant nutrients. However, few technologies have been evaluated for their combined effect on improving both soil water content and SOC. Here we assess the use of lactobionic acid and lactobionate salts as a potential soil amendment for increasing both soil water content (i.e., soil water/moisture retention) and SOC.

Lactobionic acid can be generated by chemically and/or enzymatically oxidizing lactose, a disaccharide sugar composed of galactose and glucose units. The lactose is oxidized into lactobionic acid (LBA) having the molecular formula:

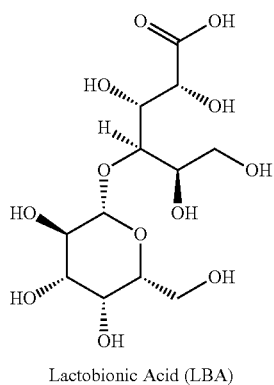 [SMILES: O=C(O)[C@H](O)[C@@H](O)[C@H](O[C@@H]1O[C@H](CO)[C@H](O)[C@H](O)[C@H]1O)[C@H](O)CO]

Lactobionic Acid (LBA)

Salts of lactobionic acid can be generated by neutralizing the acid with an alkaline compound such as hydroxides of sodium (NaOH), potassium (KOH), calcium ($CaOH_2$) and/or ammonia ($NH_4OH$), among other alkaline compounds, to form salts of the lactobionic acid such as sodium lactobionate (Na-LB), potassium lactobionate (K-LB), calcium lactobionate (Ca-LB), and ammonium lactobionate ($NH_4$-LB). Unlike more common food production byproducts such as chemically complex olive mill pulp and grain meals, the lactobionate salts have a simple sugar molecule as their anion, and are also rich in conjugate, small-molecule cations (e.g., $K^+$, $Ca^{2+}$, $NH_4^+$). This abundant combined supply of sugar and cations may improve soil moisture and SOC concentrations through mechanisms that directly alter a soil's capacity to retain water and store carbon.

The lactose used to make the lactobionic acid and lactobionate salts may be supplied directly from milk, or indirectly from food making processes that use milk. For example, lactose is a byproduct of cheesemaking (e.g., pasta filata cheesemaking such as mozzarella cheesemaking). Large amounts of lactose in starting milk (e.g., pasteurized dairy milk) is removed with liquid whey proteins during the separation of the whey from the coagulated curd. Various methods may be employed to separate the lactose from the whey or milk directly, including filtration (e.g., ultrafiltration), and lactose crystallization techniques, among others.

The lactobionate salts can supply a significant amount of alkali metal and alkali earth metal cations to a soil. The abundance of these cations in the soil can directly affect soil structure and aggregation, which are key controls on how well soil retains water (i.e., soil water content). Since cations have a positive charge, they interact with negatively charged clay surfaces, helping to hold clay particles together. Potassium cations ($K^+$) and calcium cations ($Ca^{2+}$) have been shown to be effective at flocculating clays to help form soil aggregates that improve water infiltration and water movement. The influence of cation abundances extends beyond the soil's water content to also include improvements in SOC storage. Soil carbon accumulates and becomes physically protected within soil aggregates (e.g., clay aggregates). As such, enhancing soil aggregation through increases in cation abundances may not only influence soil water infiltration and retention but also the storage of SOC. In some cases, the high abundance of $Ca^{2+}$ has been strongly related to soil carbon concentrations, even more so than soil inorganic content like clays and other particulate matter. Some cations can also increase SOM accumulation by facilitating electrostatic bridging between soil particle surfaces and SOM, protecting SOM from the microorganisms that break it down. Thus, lactobionate salts may have an ability to alter soil structure in ways that improve both soil water content and SOC levels through their effect on cation abundance.

The lactobionate anion, a derivative of glucose and galactose sugars, may not persist in soil for an extended period since sugars may be rapidly consumed by soil microorganisms. These microorganisms source much of their energy needs from plant sugars, often in limited supply, which they metabolize to build and grow their own cellular biomass. However, while lactobionate may be quickly transformed by the microbial community in the soil for metabolism, the microbial biomass that is supported by such sugars is a primary input to SOC pools associated with clay minerals. Indeed, it is now thought that most of the long-term soil carbon originates from the accumulation of dead microbial materials. Amending soil with lactobionate salts provides a readily available source of sugar to the microorganism community that may then be transferred to SOC as microbial biomass. The increase in SOC increases the water retention of the soil.

In addition to the lactobionate anions, the soil microorganisms may also consume nitrogen-containing compounds. When the lactobionate anions from the soil enhancement agent are applied in combination with a nitrogen-containing fertilizer, at least a portion of these nitrogen-containing compounds may be sourced from the nitrogen-containing fertilizer. For example, the soil microorganisms may consume nitrogen-containing compounds from the nitrogen-containing fertilizer such as ammonium-containing compounds (e.g., ammonium hydroxide, ammonium salts), nitrate-containing compounds (e.g., ammonium nitrate, nitrate salts), and urea containing compounds (e.g., urea), among other kinds of nitrogen-containing compounds.

In some instances, the consumption of nitrogen-containing compounds by the soil microorganisms may reduce an initial level of available soil nitrogen for use by crops. Thus, more nitrogen-containing fertilizer may be initially applied to the soil than used in soil treatments that do not include a lactobionate-containing soil enhancement agent. The larger initial amount of nitrogen-containing fertilizer compensates for the increased consumption of soil nitrogen by the soil microorganisms that are growing at an accelerated rate due to abundance of lactobionate anions. As the growth cycle of the crops progress, the microorganisms may start to die and decay to release the microbial nitrogen back into the surrounding soil for use by the crops. Thus, a portion of the initial nitrogen consumed by the soil microorganisms is made available to the crops at a later time in their growing cycle through the death and decay of the soil microorganisms. In many instances, the extended release of nitrogen from the decay of the soil microorganisms results in the soil having higher levels of nitrogen later in the growing cycle of the crops than would otherwise be possible with a lower mass of microorganisms in the soil. In some instances, the increased soil nitrogen levels provided by the decaying soil microorganisms reduces or eliminates the need for additional applications of nitrogen-containing fertilizer to the soil in later stages of the crops' growing cycle.

Exemplary Soil Enhancement Formulations

Exemplary formulations of soil enhancement agents include one or more salts of lactobionic acid. These salts may include alkali metal salts of lactobionic acid such as sodium lactobionate and potassium lactobionate. They may also include alkali earth metal salts such as magnesium lactobionate and calcium lactobionate. They may further include nitrogen-containing salts such as ammonium lactobionate. When the lactobionate salts are derived from a cheesemaking process, the primary salts are generally potassium lactobionate and calcium lactobionate. In some instances, the salts may further include sodium lactobionate. In some examples, the one or more salts of lactobionic acid are chosen from a group that includes potassium lactobionate, calcium lactobionate, and ammonium lactobionate. In additional examples, the one or more salts of lactobionic acid includes a single lactobionate salt such as potassium lactobionate, calcium lactobionate, or ammonium lactobionate.

The one or more lactobionate salts may be present in an aqueous solution of the soil enhancement agent in a quantity ranging from 1% to 100% based on the dry weight of the soil enhancement agent. When the soil enhancement agent is a powder, the lactobionate salts may be 90-100 wt. % of the powder. Whether an aqueous solution or powder, the amount of lactobionate salts applied to the soil may be between 0.01 to 10 wt. % based on the total weight of the soil. The concentration of the lactobionate salt in the soil may vary depending on the type of crop grown in the soil, water availability, and whether the soil enhancement agent is tilled into the soil, applied on the surface of the soil, or applied in a localized area on and around crop seeds. Other exemplary concentration ranges include 10% to 95% dry wt., 10% to 90% dry wt., 10% to 80% dry wt., 20% to 70% dry wt., among other concentration ranges. In some examples, the soil enhancement agent may be applied as a dry powder to the soil, and the one or more lactobionate salts contribute up to 100 wt. % of the dry powder agent.

In some examples, the soil enhancement agent may also include one or more additional compounds with the lactobionate salt. These additional compounds may include fertilizers, microorganism activators, yeasts, biocides, surfactants, and pH buffers, among other compounds. They may also include microorganisms such as diazotrophs that increase the amount of nitrogen fixation in the roots of plants growing in the soil treated with the soil enhancement agent. These additional compounds may make up from 1% to 99.99% of the soil enhancement agent by dry weight, 10% to 80% by dry weight, 20% to 70% by dry weight, 30% to 60% by dry weight, 40% to 50% by dry weight, etc., with the balance representing the one or more salts of lactobionic acid.

In additional examples, the soil enhancement agent may lack nitrogen-containing compounds that are separately provided by a nitrogen-containing fertilizer. For example, the soil enhancement agent may lack one or more of ammonium-containing compounds, nitrate-containing compounds, and urea compounds. In some examples, the soil enhancement agent lacks all ammonium-containing compounds except for ammonium lactobionate. In some examples, nitrogen-containing compounds in the soil enhancement agent exclusively come from proteins. In some examples, the soil enhancement agent has less than 10 wt. % protein, less than 5 wt % protein, less than 2 wt. % protein, or less than 1 wt. % protein, among other thresholds for the highest weight percentage of protein based on the total weight of the soil enhancement agent. In some examples, the soil enhancement agent lacks any nitrogen-containing compounds.

In some examples, the soil enhancement agent may be an aqueous solution or mixture that includes the one or more salts of lactobionic acid. The water content of the agent may range from 99.99 wt. % to 5 wt. % of the total weight of the soil enhancement agent. Additional ranges include 90 wt. % to 10 wt. %, 80 wt. % to 20 wt. %, 70 wt. % to 30 wt. %, 60 wt. % to 40 wt. %, etc. The balance of the soil enhancement agent includes the dissolved, suspended, and intermixed solids including the one or more salts of lactobionic acid. The sources of the water may include unfiltered water, filtered water, purified water, and deionized water, among other sources of water. In some examples, at least a portion of the water comes from a cheesemaking process that supplies the lactose and/or lactobionic acid that is converted into lactobionate salts for the soil enhancement agent.

Exemplary Methods of Applying the Soil Enhancement Agent to Soil

Exemplary methods of applying the soil enhancement agent to a soil may include spraying and pouring for liquid applications, and spreading, scattering and sprinkling for solid applications. Exemplary methods may further include plowing, tilling, or in some other way mixing the treated soil to provide a more uniform distribution of soil enhancement agent. Exemplary methods may also include localizing the application of the soil enhancement agent in and around the planted crop seeds instead of a blanket application across a soil field.

The amount of soil enhancement agent applied to the soil may depend on one or more factors such as, the composition of the soil enhancement agent and/or the nitrogen-containing fertilizer, the composition of the soil before treatment, the growing climate, the types of crops grown, and the target goal (generally measured as a weight percentage of the total soil weight) for soil moisture, soil organic carbon, and/or soil nitrogen, in a soil depth region (e.g., topsoil at 0-5 cm depth, subsoil at 5-15 cm depth, etc.). In some embodiments, the amount of soil enhancement agent may be determined based on trying to achieve a target level of soil organic carbon in the soil. For example, the amount of soil enhancement agent applied to the soil may be based on trying to achieve a weight percentage of soil organic carbon ranging from 1 wt. % to 5 wt. % to the weight of the soil. Additional exemplary ranges include 1 wt. % to 4 wt. %, 1 wt. % to 3 wt. %, and 1 wt. % to 2 wt. % added carbon as a weight percentage of the total weight of the soil. In additional embodiments, the amount of soil enhancement agent may be determined based on a target level of the agent to apply per acre of soil. For example, the when the soil enhancement agent is an aqueous solution or mixture (measured in gallons (i.e., 3.79 liters)), the amount of soil enhancement agent applied to the soil may range from 1 gallon/acre to 200 gallons/acre. Additional exemplary ranges include 10 gallons/acre to 200 gallons/acre, 30 gallons/acre to 200 gallons/acre, 50 gallons/acre to 200 gallons/acre, 50 gallons/acre to 150 gallons/acre, and 50 gallons/acre to 100 gallons/acre, among other exemplary ranges.

In some embodiments, there may be a target amount of soil enhancement agent to apply to the soil in order to achieve specific soil characteristics, such as a target soil moisture level, a target soil organic carbon level, and/or a target soil nitrogen level, among other soil characteristics. For example, the soil enhancement agent may be applied in a range of 50 gallons/acre to 200 gallons/acre in order to achieve a target soil moisture level. When the soil enhancement agent is applied in these amounts/acre, more moisture is retained in the soil than when smaller or larger amounts of the agent are applied. The target range may shift depending upon the specific crop grown, the starting soil conditions, and the climate conditions, among other factors.

Embodiments also include single and multiple applications of the soil enhancement agent during a crop planting, growing and harvesting cycle.

Exemplary crops that may be used with the present soil enhancement agents include fruits such as tomatoes, strawberries, raspberries, blueberries, blackberries, and/or grapes, among other types of fruit. Squashes such as pumpkins, zucchini, turban, buttercup, acorn, and golden nugget, among other types of squashes. They may also include grain and seed crops such as corn, rice, wheat, barley, lentils, soybeans, rye, sunflower, and quinoa, among other grain and seed crops. Exemplary crops may further include fruit trees, nut trees, flowers, grasses, and turfs. The soil enhancement agents may also be used in potting mixes, and fertilizing mixes, among other types of mixes.

Exemplary methods also include applying both a soil enhancement agent and a nitrogen-containing fertilizer to a soil. In some of these exemplary methods, the soil enhancement agent and the nitrogen-containing fertilizer are applied to the soil at the same time. For example, the soil enhancement agent and the nitrogen-containing fertilizer may be combined (e.g., premixed) before their application to the soil as a single compound. In additional examples, the soil enhancement agent and the nitrogen-containing fertilizer may be separately supplied to the soil at approximately the same time. In additional exemplary methods, the soil enhancement agent and the nitrogen-containing fertilizer are applied to the soil at different times. For example, the soil enhancement agent may be applied to the soil at a first time and the nitrogen-containing fertilizer may be subsequently applied at a second time that is later than the first time. The separation between the first and second times may range, for example, from 1 hour to 1 month. Other exemplary ranges include: 1 day to 1 month, 2 days to 1 month, 1 week to 1 month, and 2 weeks to one month, among other time ranges. In additional examples, the nitrogen-containing fertilizer may be applied to the soil at first time and the soil enhancement agent may be subsequently applied at the second time.

As noted above, the amount of soil enhancement agent applied to the soil may depend on one or more factors such as, the composition of the soil enhancement agent and/or the nitrogen-containing fertilizer, the composition of the soil before treatment, the growing climate, the types of crops grown, and the target goal (generally measured as a weight percentage of the total soil weight) for soil moisture, soil organic carbon, and/or soil nitrogen, in a soil depth region (e.g., topsoil at 0-5 cm depth, subsoil at 5-15 cm depth, etc.). One or more of the same factors may be considered when determining the amount of nitrogen-containing fertilizer to apply to the soil. Exemplary amounts of soil enhancement agent used in soil applications may include amounts that achieve an added weight percentage of soil organic carbon ranging from 1 wt. % to 5 wt. % to the weight of the soil. Additional exemplary ranges include 1 wt. % to 4 wt. %, 1 wt. % to 3 wt. %, and 1 wt. % to 2 wt. % added carbon as a weight percentage of the total weight of the soil. Exemplary amounts of nitrogen-containing fertilizer may include amounts that achieve a soil nitrogen concentration ranging from 40 lbs/acre to 80 lbs/acre in the topsoil. Additional exemplary ranges include 50 lbs/acre to 70 lbs/acre, and 55 lbs/acre to 65 lbs/acre of soil nitrogen.

EXPERIMENTAL

Given the properties of lactobionate salts as a supply of cations and carbohydrates, both influencing soil structure and microorganism growth, lactobionate was evaluated as a potential soil amendment for increasing a soil's water content and SOC. Specifically, formulations of calcium-, potassium-, and ammonium-lactobionate salts over time were compared to evaluate the effects of different lactobionate inputs on soil water retention, microbial biomass and carbon concentrations. In order to identify soils with the greatest potential to respond to lactobionate inputs, the use of lactobionate across soils that differ in texture and initial SOC were also evaluated. The evaluations were used to test the effectiveness of lactobionate salts as a soil amendment for increasing a soil's water retention, SOC, as well as other aspects of soil health.

Lactobionate salt formulations (specifically $K^+$, $NH_4^+$, and $Ca^{2+}$ lactobionate salts) were compared across a range of soil types to determine what soils and lactobionate type would be most effective for increasing soil water retention and soil organic carbon (SOC) retention compared to soils that received no amendment. All of the tested lactobionate amendments increased soil water content relative to unamended soil, as well as compared to a commercially available polymer gel amendment. Thus, lactobionate has the potential to increase water retention by reducing water loss from the soil. Potassium lactobionate (K-LB) amendments were found to be the most effective and most consistent in their influence on both soil water retention and soil organic carbon content (SOC) throughout the two-month laboratory experiment. Moreover, the magnitude of effects was greater on soil with relatively initially greater SOC content within a site.

Field soils were obtained from near Fresno, California (Fr) and Akron, Colorado (Ak). At both locations, soils were collected from two different but adjacent fields that represent either a relatively low carbon (LC) or high carbon (HC) soil (see Table 1 below). Mean annual precipitation in Fresno and Akron is 11.5 and 16 in., respectively. The two Fr soils were obtained from the USDA-ARS Parlier field station and have both been under conventional agricultural cultivation practices for the region. The Fr-HC field has been under reduced tillage and has a winter cover crop planted, while the Fr-LC field is fallow in the winter and receives conventional tillage operations. Both Fr soils are Hanford series fine sandy loam. The Ak soils were collected from the USDA-ARS Central Great Plains Research station experimental erosion plots. The Ak-LC soil was obtained from a site that has been mechanically eroded down to the B horizon, while the Ak-HC non-eroded soil was collected from an adjacent grassland. Both Ak soils are silty loam Weld Series.

TABLE 1

Experimental Treatments and Soil Site Characteristics

| Soil site<br>n = 2 | Fresno, CA (Fr)<br>fine sandy loam | | Akron, CO (Ak)<br>silty loam | |
|---|---|---|---|---|
| Soil C n = 2 | HC | LC | HC | LC |
| Management | Cover crop; reduced tillage | Winter fallow; intensive tillage | Non-eroded, grassland | Mechanically eroded |
| WHC (%) | 0.204 | 0.22 | 0.32 | 0.26 |
| OC (%) | 1.02 | 0.29 | .78 | 0.84 |
| TN (%) | 0.12 | 0.04 | 0.19 | 0.12 |
| Amendment<br>n = 5 | $NH_4$-LB | Ca-LB | K-LB | Gel | Control |
| Sampling<br>time n = 3 | 1 wk | | 1 mo | | 2 mo |

"WHC" = Soil Water Holding Capacity
"OC" = Total Organic Carbon
"TN" = Total Nitrogen
"HC" = Soils with High Carbon Content
"LC" = Soils with Low Carbon Content The sites were chosen for this study for their adjacently located high and low carbon soils and their susceptibility to drought and low soil moisture during the summer growing season. In preparation for testing, the soils were passed through a 2 mm-mesh sieve to homogenize samples and removed large (>2 mm) surface and belowground organic material. They were then air-dried for 2 weeks and analyzed for initial total organic C, N, and carbonates, and water holding capacity (WHC) (see Table 2 below).

TABLE 2

The Amount of Carbon (C), Total Amendment, and Lactobionate Salt (LB) Added for Each Amendment Treatment

| Amendment | % C added | g. amendment g⁻ soil | % LB solids | g LB added g⁻ soil |
|---|---|---|---|---|
| $NH_4$-LB | 1.695 | 0.121 | 35 | 0.0424 |
| Ca-LB | 1.695 | 0.045 | 95 | 0.0424 |
| K-LB | 1.695 | 0.045 | 95 | 0.0424 |
| Gel (Soil2O) | na | 0.002 | na | na |
| Control | 0 | 0 | 0 | 0 |

The processed Ak and Fr soils (n=4) were used to conduct a two-month laboratory incubation experiment to evaluate the effects of lactobionate (LB) amendments on soil water retention, carbon and nutrient availability. The experimental setup consisted of four amendment treatments plus a control. Three of the amendments were lactobionate combined with ammonium (NH4-LB), calcium (Ca-LB), or potassium (K-LB) salts. The fourth amendment (Gel) is a commercially available cross-linked polymer soil amendment Soil2O gel (GelTech Solutions, Inc.). Our control treatment (Con) did not include any amendment additions. These five amendment treatments were combined in a full factorial with the four soils (Fr-HC, Fr-LC, Ak-HC, and Ak-LC), and we included three destructive harvest time points (Table 1). All treatments were replicated three times for a total of 180 sample units.

To prepare the incubation treatments 200 g of air-dried soil were mixed with the amendment and then brought up to 45% water retention. Each LB amendment was added at a rate to achieve 0.169 g of lactobionate-C g-soil (Table 2). We added 0.002 g of Soil2O Gel g-soil based on the commercially recommended application rate. From the 200 g of amended soil mixture, we separated 20 g dry weight soil into individual 40 mL falcon tubes, covered with parafilm and incubated at a constant 25° C. temperature until sampling. Soil moisture was checked twice weekly and readjusted to 45% WHC if necessary. Samples were destructively harvested at 2 weeks, 1 and 2 months from the start of the incubation.

For each destructive soil sampling at 2 weeks, 1 month, and 2 months, we obtained soil moisture curves along with soil microbial biomass C (MBC), ammonium ($NH_4^+$) and nitrate ($NO_3^-$) concentrations, and total soil carbon (C) and nitrogen (N). Soil water potential is a useful metric to describe water availability and the ability of plants to extract it. Water potential varies by soil texture, water content, pore space and the surface properties of the soil. At saturation, water potential is zero and becomes increasingly negative as the soil becomes drier. Soil moisture curves were generated by measuring soil water potential over time with a WP4C dew point potentiometer (Decagon Devices; Pullman, WA). Water potential measurements were taken at in situ moisture levels and collected a minimum of 6 water potential measurements while the soils were allowed to air dry. Gravimetric soil water content (GWC) was determined at each water potential measurement based on the difference between wet and oven-dried soil weight.

To determine MBC, $NH_4^+$ and $NO_3^-$, we extracted soils with 0.5 M $K_2SO_4$ within three days of sampling. Following extraction, samples were stored at 20° C. until analyzed for total dissolved organic carbon (TOC) or inorganic nitrogen (N). MBC was determined using the chloroform-fumigation extraction method and calculated as the difference between fumigated and unfumigated TOC (TOC-L CSH/CSN; Shimadzu; Kyoto, Japan). Soil $NH_4^+$ and $NO_3^-$ was determined from extracts on an Alpkem Flow Solution IV Automated Chemistry Analyzer.

Estimated soil water potential, soil MBC, inorganic N, and total soil C and N were analyzed using a linear mixed-model three-way analysis of variance (ANOVA) where replicate was used as a random effect and site (Fr and Ak), initial soil C (HC and LC), and amendment (NH4-LB, Ca-LB, K-LB, Gel, Con) were treated as fixed effects. Interactions among fixed effects were initially included in the model but if not significant (P>0.05) were removed and the model was reanalyzed. Pearson correlation analysis was used to evaluate relationships between soil moisture and SOC and MBC. Differences in means were determined by Tukey's HSD and considered significant if P<0.05. All variable were analyzed within separate sampling time points.

To compare the relationships between soil water potential and water content, we applied non-linear model fitting using measured water potential (Mpa) and gravimetric water content (GWC; g water g-dry soil) values. For each sample, we input observed Mpa and GWC into a power function: $y=ax^b$; where y is water potential (in Mpa) and x is GWC to model the continuous GWC response to changes in Mpa. Model output was considered acceptable if the square residuals were less than 5. A model was generated for each sample that then allowed us to derive GWC for a set range of Mpa.

Experimental Results

Soils treated with lactobionate had overall higher soil water content across a range of water potentials compared to both control soils and soils amended with the Soil2O gel. This effect generally persisted throughout the 2-month incubation period. Soil water content was highest for K-LB followed by NH4-LB>Ca-LB>Gel>Con both near field capacity (−0.5 Mpa) and for drier soils (−1.0 Mpa) (see FIG.

1). Only the K-LB amended soils had consistently positive effects on soil water retention relative to the control soils throughout the incubation period and across soil water potentials. The positive effect of lactobionate was highest at 2 weeks and had declined by 1 month. However, there was no difference in the magnitude of the effect between 1 and 2 months. The observed increases in soil moisture due to LB additions also varied by soil water potential, where the difference between amended and control soils was greatest in wetter soils and declined at lower water potentials (more negative).

Figure 2:
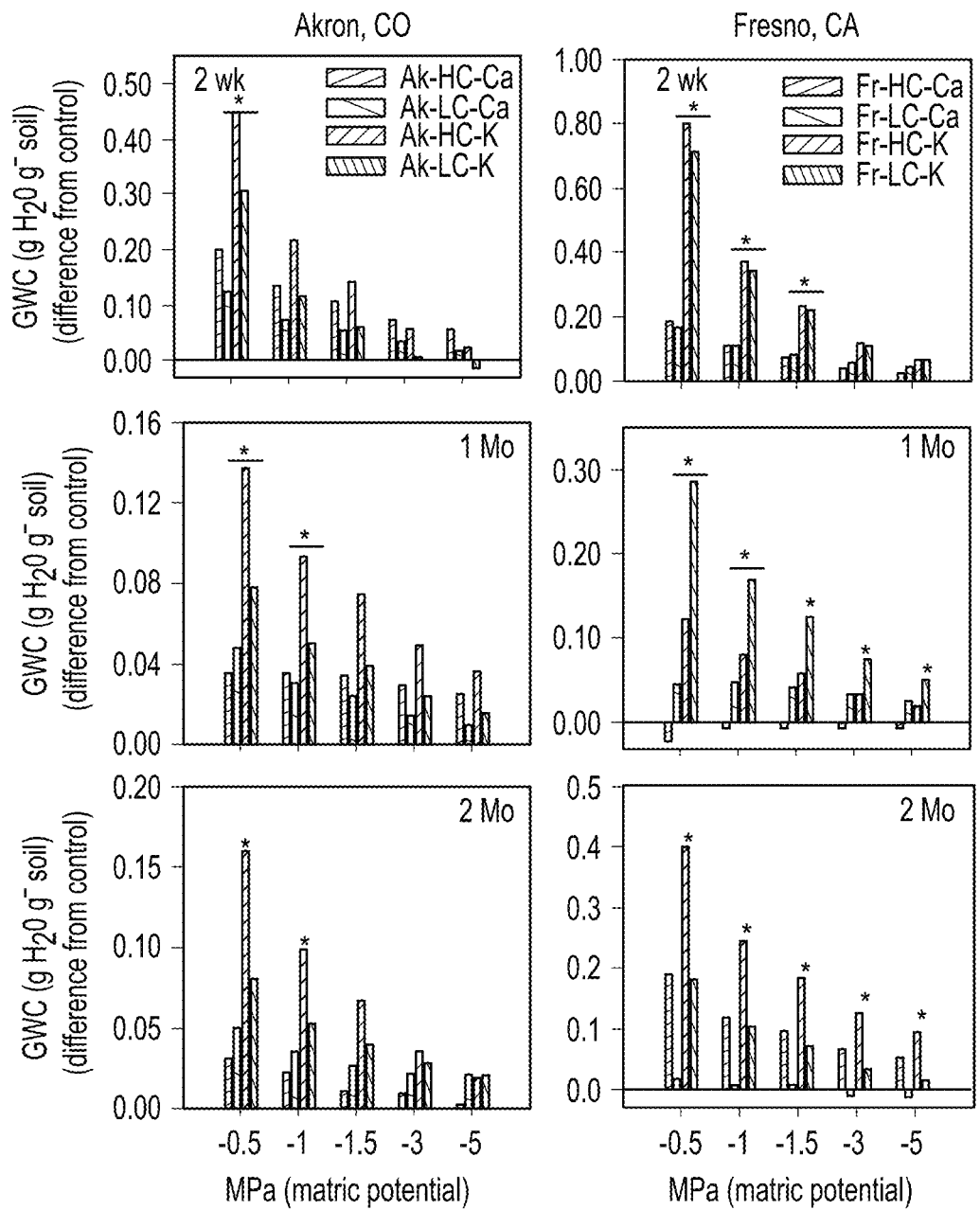
FIG. 2 shows graphs of differences in gravimetric soil water content (GWC) between K- and Ca-lactobionate amended and control soils over a period of 2 weeks to 2 months.

The effect of lactobionate on soil water retention also depended on site and initial soil C concentrations. For example, the soils with initially higher SOC generally exhibited a stronger response to lactobionate amendments compared to low SOC soils (see FIG. 2). Interestingly, even though initial SOC concentrations were overall lower in the Fresno, CA soils these had a stronger response to lactobionate compared to the Akron, CO soils.

Figure 3:
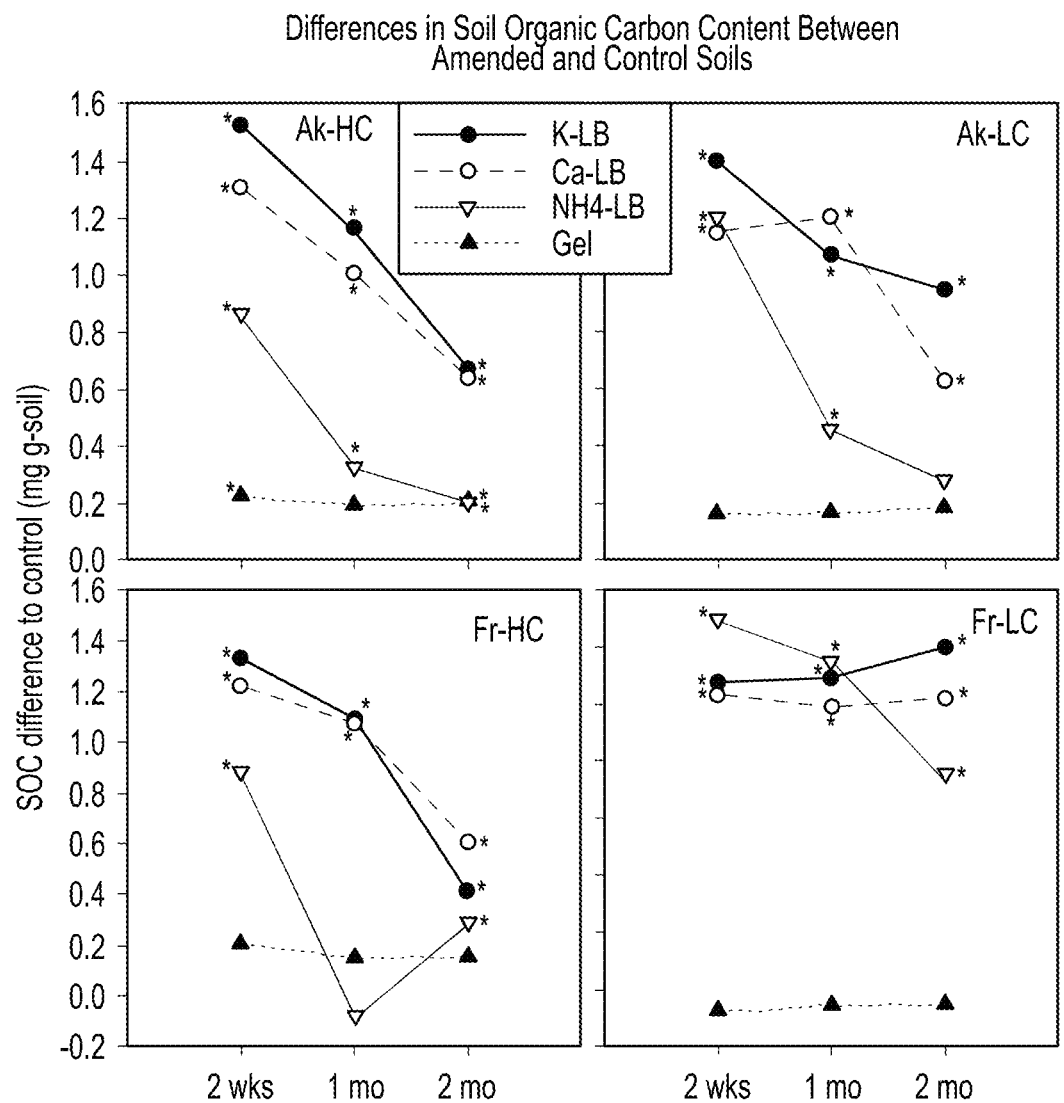
FIG. 3 shows charts of differences in soil organic carbon (SOC) between amended and control soils over a period of 2 weeks to 2 months.

Changes to total SOC were examined following lactobionate amendments over the course of the incubation. Similar to soil moisture, persistent effects of amendment additions on SOC were observed, where LB increased SOC relative to the control soils (see FIG. 3). There was no difference in SOC between the Gel treatment and the Con, except for in the AK-HC amended soils. In general, the K- and Ca-LB treatment resulted in the largest increases in SOC.

At 2 weeks, K- and Ca-LB increased SOC by nearly 1.5 mg g-soil and by a minimum of 0.6 mg g-soil at 2 mo. In the low C soils at 2 weeks, NH4-LB soils showed a similar SOC response to that of the K- and Ca-LB soils. Though this did not persist and by 2 months much more of the SOC initially gained had been lost in the NH4-LB soils compared to the K- and Ca-LB soils. The soils that retained the most SOC gained following amendment additions were the lower C soils. This was especially pronounced in the Fresno LC soils where there were no observed declines in SOC over time for the K- and Ca-LB treatments.

Figure 4:
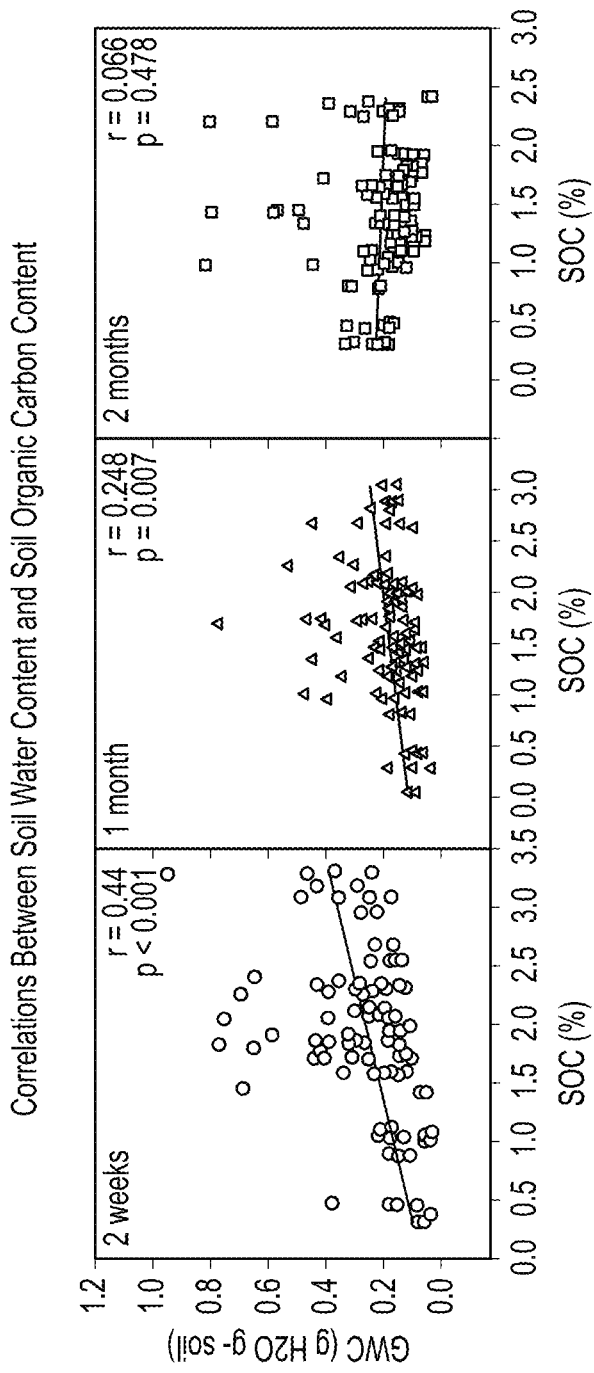
FIG. 4 shows charts of correlations between gravimetric soil water content (GWC) and soil organic carbon (SOC) in soils over a period of 2 weeks to 2 months.

In order to evaluate if differences in SOC were related to the observed differences in GWC all SOC was correlated against the estimated water content for −0.5 and −1.0 Mpa (see FIG. 4). Initially, there was a strong relationship between SOC and soil water content, where SOC explains 44% of water content variability. However, this relationship declined over time such that by 2 months there is no discernable effect of SOC on soil moisture (FIG. 4).

Regardless of LB formulation, increases were observed in soil microbial biomass carbon (MBC) with the addition of lactobionate, often 50 times greater relative to both Gel amended and Con soils (see Table 3 table). At 1 month MBC in LB soils had declined compared to at 2 weeks, but was still 5-100 times greater compared to the unamended soils. The exception was the Fr-HC soils, where MBC increased over time in all amended treatments. No significant differences were observed between NH4-, K-, and Ca-LB amendments on total MBC at 2 weeks, but at 1 month the total MBC was lower in NH4-LB compared to K- and Ca-LB soils.

TABLE 3

Soil Microbial Biomass Carbon (MBC) by amendment, cite, and initial soil organic carbon (SOC) at 2 weeks and 1 month, and three-way ANOVA P-Values.

| | | MBC (mg C kg -soil) | | | |
| --- | --- | --- | --- | --- | --- |
| | | Akron, CO (Ak) | | Fresno, CA (Fr) | |
| Amendment | SOC | 2 wks | 1 month | 2 wks | 1 month |
| K-LB | HC | $8349.51^{AC}$ | $7790.40^{CD}$ | $1369.60^{A}$ | $16689.85^{AB}$ |
| | LC | $11189.75^{A}$ | $10597.30^{BC}$ | $12167.76^{A}$ | $7277.63^{CD}$ |
| Ca-LB | HC | $9197.28^{ABC}$ | $6395.35^{CDE}$ | $10362.94^{A}$ | $11289.89^{BC}$ |
| | LC | $13087.10^{A}$ | $9816.22^{C}$ | $10133.11^{A}$ | $7560.73^{CD}$ |
| NH4-LB | HC | $11037.60^{A}$ | $869.62^{EF}$ | $13627.26^{A}$ | $18504.80^{A}$ |
| | LC | $9911.52^{A}$ | $3225.38^{DEF}$ | $8610.50^{AC}$ | $739.12^{EF}$ |
| Gel | HC | $73.87^{B}$ | $218.37^{EF}$ | $222.57^{B}$ | $154.32^{F}$ |
| | LC | $8.95^{B}$ | $234.01^{EF}$ | $27.68^{B}$ | $35.08^{F}$ |
| Control | HC | $193.15^{BC}$ | $156.57^{F}$ | $233.30^{B}$ | $138.48^{F}$ |
| | LC | $188.73^{B}$ | $150.39^{F}$ | $17.22^{B}$ | $20.11^{F}$ |

| ANOVA | P-value | |
| --- | --- | --- |
| Site | 0.4 | <.0001 |
| SOC | 0.9 | 0.0001 |
| Amendment | <0.001 | <.0001 |
| Amend*SOC | 0.2801 | <.0001 |
| Amend*Site | 0.3972 | 0.0001 |
| Site*SOC*Amendment | 0.64 | <.0001 |

Treatments that are different within a sampling time are indicated by different letters.

Lactobionate amendments only influenced $NH_4^+$ concentrations under NH4-LB additions (Table 4). However, NH4-LB increased $NH_4^+$ concentrations well above the typical range for most agricultural soils (2-10 ppm). The other LB treatments had a smaller effect on $NH_4^+$ compared to Con soils. Though initially low, $NH_4^+$ concentrations in Ca- and K-LB soils increased over time to 1.5-3 ppm by 2 months.

Soil $NO_3^-$, produced from $NH_4^+$ during microbial nitrification, was depleted in all lactobionate amended soils within the first month compared to both Gel and Con soils (see Table 4 below). For both K- and Ca-LB treated soils, $NO_3^-$ remained low (<2 ppm) throughout the course of the experiment while NH4-LB increased at 2 months to 46-200 ppm. The Gel and Con soil $NO_3^-$ levels only increased slightly from the first 2 weeks to 2 months.

All lactobionate amendments increased soil water content, relative to unamended soil, across a range of water potentials tested, suggesting that lactobionate has the potential to increase soil water content by reducing water loss from the soil. Specifically, the impact of lactobionate on the relationship between soil water content and water potential was characterized. This relationship typically varies across different soils and is strongly influenced by soil structure and texture. Water potential characterizes the energy required for water to move through the soil profile or be taken up by crop roots. Finer textured soils hold more water at a given water potential compared to coarser sandy soils. This is in part because the greater surface area and tighter pore space of fine textured clay result in more energy required to move water through the profile. Consequently, greater water stor-

TABLE 4

Soil Ammonium (NH4+) and Nitrate (NO3–) Concentrations by Amendment, Site, and Initial
Soil Organic Carbon Content (SOC) at 2 Weeks, 1 Month, 2 Months, and 3-Way ANOVA P-Values
Treatments that are different within a sampling time are indicated by different letters.

| Amendment | Site | SOC | NH4 (μg g-soil) | | | NO3– (μg g-soil) | | |
| --- | --- | --- | --- | --- | --- | --- | --- | --- |
| | | | 2 wks | 1 mo | 2 mo | 2 wks | 1 mo | 2 mo |
| K-LB | Ak | HC | 0.58 $^C$ | 0.1707 $^D$ | 0.86 $^B$ | 0.17 $^C$ | 0.13 $^E$ | 0.21 $^C$ |
| | | LC | 0.41 $^C$ | 0.1067 $^D$ | 1.29 $^B$ | 0.17 $^C$ | 0.22 $^E$ | 0.09 $^C$ |
| | Fr | HC | 1.74 $^C$ | 1.0747 $^D$ | 1.39 $^B$ | 0.04 $^C$ | 0.24 $^E$ | 0.09 $^C$ |
| | | LC | 1.31 $^C$ | 0.1933 $^D$ | 1.78 $^B$ | 0.19 $^C$ | 0.23 $^E$ | 0.08 $^C$ |
| Ca-LB | Ak | HC | 1.48 $^C$ | 1.0337 $^D$ | 1.63 $^B$ | 0.22 $^C$ | 0.12 $^E$ | 0.15 $^C$ |
| | Fr | LC | 0.53 $^C$ | 0.1587 $^D$ | 2.23 $^B$ | 0.30 $^C$ | 0.05 $^E$ | 2.24 $^C$ |
| | | | 1.87 $^C$ | 0.8587 $^D$ | 2.13 $^B$ | 0.29 $^C$ | 0.05 $^E$ | 0.75 $^C$ |
| | | | 1.76 $^C$ | 0.821 $^D$ | 3.10 $^B$ | 0.17 $^C$ | 0.02 $^E$ | 0.74 $^C$ |
| NH4-LB | Ak | HC | 159.28 $^{AB}$ | 219.9 $^B$ | 135.97 $^A$ | 0.91 $^C$ | 0.96 $^E$ | 199.58 $^A$ |
| | | LC | 159.96 $^{AB}$ | 226.65 $^B$ | 117.68 $^A$ | 1.27 $^C$ | 0.24 $^E$ | 154.19 $^{AB}$ |
| | Fr | HC | 188.38 $^A$ | 282.84 $^A$ | 123.64 $^A$ | 0.10 $^C$ | 2.09 $^E$ | 46.87 $^B$ |
| | | LC | 144.91 $^B$ | 125.24 $^C$ | 142.80 $^A$ | 0.50 $^C$ | 0.02 $^E$ | 88.69 $^{AB}$ |
| Gel | Ak | HC | 1.22 $^C$ | 0.2387 $^D$ | 0.55 $^B$ | 52.09 $^{AB}$ | 72.99 $^A$ | 63.66 $^{AB}$ |
| | | LC | 1.21 $^C$ | 0.1867 $^D$ | 0.78 $^B$ | 41.06 $^{AB}$ | 52.15 $^C$ | 81.17 $^{AB}$ |
| | Fr | HC | 1.60 $^C$ | 0.3777 $^D$ | 0.70 $^B$ | 35.74 $^B$ | 56.53 $^{BC}$ | 53.25 $^B$ |
| | | LC | 1.05 $^C$ | 0.2867 $^D$ | 0.72 $^B$ | 9.06 $^C$ | 10.96 $^D$ | 63.00 $^{AB}$ |
| Control | Ak | HC | 1.25 $^C$ | 0.1903 $^D$ | 0.58 $^B$ | 57.00 $^A$ | 70.39 $^A$ | 55.24 $^B$ |
| | | LC | 1.11 $^C$ | 0.2113 $^D$ | 60.83 $^B$ | 40.88 $^{AB}$ | 52.14 $^C$ | 70.66 $^{AB}$ |
| | Fr | HC | 1.41 $^C$ | 0.2243 $^D$ | 0.81 $^B$ | 38.97 $^B$ | 62.42 $^B$ | 57.66 $^{AB}$ |
| | | LC | 1.08 $^C$ | 0.1723 $^D$ | 0.88 $^B$ | 11.13 $^C$ | 11.88 $^D$ | 58.95 $^{AB}$ |

| ANOVA | P-value | | | | | |
| --- | --- | --- | --- | --- | --- | --- |
| Site | 0.472 | 0.002 | 0.860 | <.01001 | <.0001 | 0.105 |
| SOC | 0.081 | <.0001 | 0.969 | 0.067 | <.0001 | 0.686 |
| Amendment | <.0001 | <.0001 | <.0001 | <.0001 | <.0001 | <.0001 |
| Amend * SOC | 0.020 | <.0001 | 1 | 0.247 | <.0001 | 0.830 |
| Amend * Site | 0.879 | <.0001 | 1 | <.0001 | <.0001 | 0.140 |
| Site * SOC * Amendment | 0.030 | <.0001 | 0.939 | <.0001 | <.0001 | 0.998 |

Experimental Discussion

Crop yields and the overall production capacity of soils are regulated by the soil water content, especially in regions where water is limited. The ability of a soil to retain water is in part a function of the soil structure and texture but is also influenced by soil organic matter and carbon (SOC) content. Increasing SOC in the soil can have positive effects on soil water content and help build healthy soils. Indeed, governmental agencies worldwide are more frequently instituting initiatives which encourage land managers to emphasize practices that build SOC. For example, California which leads the nation in agricultural production, introduced the Healthy Soils Initiative and Action Plan in 2015 aimed at promoting soil management practices that reduce drought risk and increase soil carbon sequestration. Lactobionate salt additions as a potential soil amendment are promising for enhancing both soil water content and SOC.

age with less water lost to evaporation or drained away from the root zone is expected. However, altering soil texture is generally not a feasible management strategy for increasing water storage at the field-level. Due to the properties of lactobionate salts which may improve soil structure and water sorption, amending soil with lactobionate salts can mimic the benefits associated with soils that have higher clay content.

The strongest effects of lactobionate salts in soils was observed between –0.5 to –1 Mpa compared to lower water potential values. The forces that regulate soil water retention differ as water potential declines (becomes more negative). At or near field capacity, water retention is strongly affected by pore size distribution and soil structure but at lower water potentials (<–3) water retention is more affected by sorption and thus soil texture and surface area become more important. Accordingly, it may be that the positive effects observed from lactobionate amendments is due more to alterations in soil structure and aggregation and less to changing the sorptive properties of the soil matrix.

The K-LB was consistently the most effective at increasing water retention throughout the 2-month incubation period across the range of soils and water potentials tested. Since $Ca^{2+}$ is a divalent cation that binds clay particles more strongly than the monovalent $K^+$, it would have been expected that the Ca-LB amendment would have the strongest and most consistent influence on soil moisture. Nonetheless, it was relatively less effective than K-LB on increasing water retention. It may be that there are other K-LB properties besides altering cation relative abundances that resulted in the stronger soil moisture effect we observed in these soils. For instance, the K-LB may be relatively more hydrophilic in solution which would enhance water sorption.

Lactobionate amendments were also more effective at retaining moisture in the Fresno soils. Interestingly, these soils have a coarser texture with lower SOC content compared to the Akron soils. It is possible that given the slightly higher moisture retention in the Akron unamended control soils that this higher water retention 'baseline' constrained room for improvement following lactobionate additions.

Lactobionate amendments elevated SOC concentrations relative to unamended soil throughout the 2-month incubation. A substantial amount of carbon was added to the soil with the input of lactobionate salts (nearly double initial native soil carbon concentrations) and so it is expected that we would observe an initial increase in SOC derived from this additional carbon source. However, lactobionate, a disaccharide ion, is a good energy source for soil microorganisms and thus likely readily consumed. Nonetheless relative increases in SOC persisted long after 2 weeks, and by 2 months amended soils often still had twice as much SOC relative to control soils. While lactobionate may be utilized by soil microbes, microbial biomass is an important carbon source for building the persistent SOC pool for the long term. As such, when microbes use lactobionate to build their own biomass, it gets transformed into microbial SOC that tends to stabilize and persist longer on soil surfaces. The elevated SOC observed in the LB-amended treatments likely rather represents LB conversion into microbial materials which thus can delay or potentially even halt its loss out of the system. Indeed, microbial biomass concentrations were observed at 50-100 times higher in LB amended soils compared to both the gel and control soils.

Figure 5A:
FIG. 5A shows an unamended soil sample used in the present studies.
Figure 5B:
FIG. 5B shows a soil sample amended with a K-lactobionate amendment.
Figure 5C:
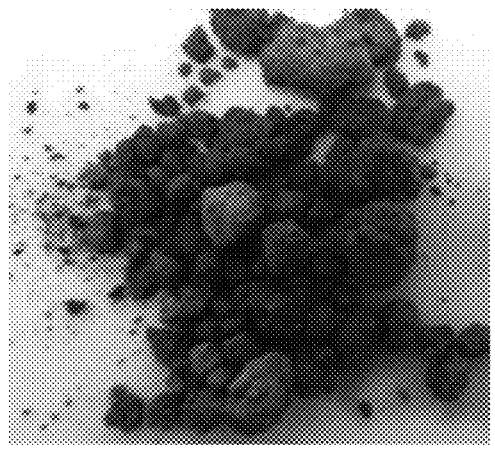
FIG. 5C shows a soil sample amended with a Ca-lactobionate amendment.

The persistence of the SOC in the LB soils may also be a consequence of changes to soil structure following LB amendments. FIGS. 5A-5C show pictures of the affects that the soil enhancing agent can have on the soil structure and aggregation. FIG. 5A shows an unamended soil sample taken from the Fresno (Fr-HC Control). FIG. 5B shows a soil sample taken from the same Fresno site to which a potassium lactobionate (K-LB) amendment has been added (Fr-HC K-LB). Finally, FIG. 5C shows a soil sample taken from the same Fresno site to which a calcium lactobionate (Ca-LB) amendment has been added. FIGS. 5A-5C provide a clear visual indication of the increased extent of soil aggregation that occurs when a lactobionate salt amendment is added to the soil. Enhancing soil structure not only improves soil water retention but also helps to protect SOC from decomposition and loss as carbon dioxide. In turn, higher levels of SOC facilitate greater water retention and sorption. As such, there is likely an interaction between a soil's water content, structure and SOC, where the magnitude of the effects of LB on soil water content (i.e., soil moisture) may be a partial consequence of increased SOC. In fact, we find that at 2 weeks and 1 month there is a significant influence of SOC on determining water content variability.

Nitrogen is an important element required for plant growth. Crops primarily take up soil nitrate ($NO_3^-$) which can be sourced from mineral fertilizers but also from the mineralization of organic N by soil microbes. The rate of N mineralization is partly a function of the ratio between soil C and N. If soil C concentrations relative to N are too high, microbes might immobilize N in their biomass, reducing how much is transformed into plant available $NO_3^-$. Given the high levels of C from lactobionate that we added to the soils, the consequences of LB on crop available N was evaluated.

Moreover, since the NH4-LB has inorganic N within it, we also wanted to compare how using an amendment with both N and C might affect the outcome of available N. The Ca- and K-LB amendment had only small influences on soil $NH_4^+$ concentrations relative to control soils. However, the use of NH4-LB resulted in $NH_4^+$ concentrations that far exceed average soil $NH_4^+$ concentration. In general, $NH_4^+$ levels increased with time suggesting that as the microbial biomass—which declined over time—is turning over it is releasing more $NH_4^+$.

Though the high inputs of carbon from Ca- and K-lactobionate had little impact on $NH_4^+$ levels, the soil $NO_3^-$ was depleted. Given the high microbial biomass in the LB amended soil and the high microbial N demand during growth, this depletion is likely because much of the inorganic N was tied up in microbial biomass. Overtime, as the microbial biomass dies and turns over in the soil, much of that N could be released back into the soil and available for plant uptake.

The evaluation of the three formulations of lactobionate salts as soil enhancement agents found that the K-LB was the most effective and most consistent in its influence on both soil water content and SOC. Moreover, the magnitude of effects was greater on soil with relatively higher carbon content within a site. The NH4-LB also proved to have positive increases on soil water content but less so on SOC concentrations. Thus, it may have use as an amendment that both fertilizes and provides a short-term carbon supply to soils taking into consideration the application rate and timing. The Ca-LB amendment had lower effects on improving soil water content compared to both K- and NH4-LB, but its effect on SOC was similar to that of K-LB and in some instances even higher. As such, the Ca-LB could be a suitable alternative to or combination with the K-LB amendment.

Overall, K-LB increased soil water content by 1-6 times compared to unamanded soils and doubled total SOC at the end of the two-month experimental period. Amending soils with LB salts was found to significantly increase the concentration of soil microorganisms relative to unamended soils but decrease soil inorganic nitrogen content. Thus, appropriate field timing should be considered for LB salt addition. For example, the LB salt additions can be timed to tie up soil nutrients during the winter, when there is high potential for nutrient losses to groundwater. The positive impacts of LB salt additions on soil moisture water retention may be attributed in part to improvements in soil structure and aggregation that facilitate water retention. This can also help protect soil carbon from losses out of the system, consistent with the higher SOC concentrations observed. The LB salt additions are also correlated with increased microbial biomass concentrations, which in turn are correlated with increased SOC retention in the treated soil. This is consistent with the observation of others that microbial materials contribute to the long-term stability of SOC in agricultural soils.

Figure 6:
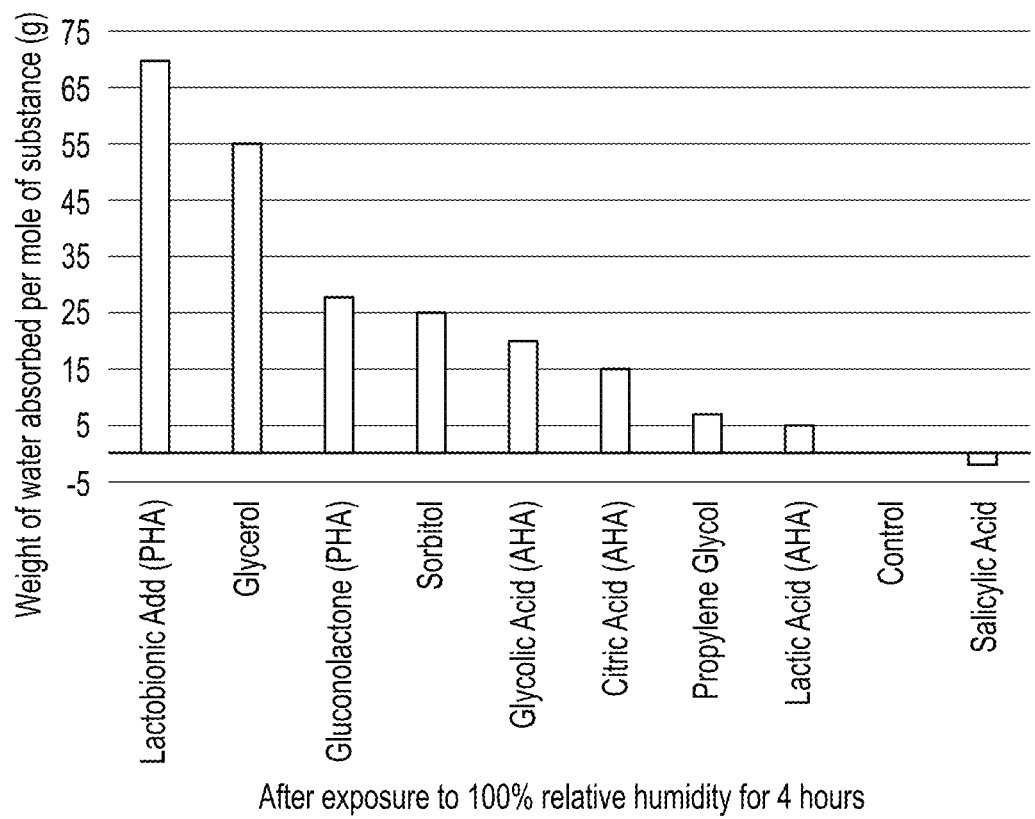
FIG. 6 shows a graph of absorbed water after exposure to 100% relative humidity for a period of 4 hours for various soil amendments.

Polyhydroxy acids (PHAs) and polyhydroxybionic acids (bionics) are organic carboxylic acids which possess two or more hydroxyl groups on an aliphatic or alicyclic molecular structure. When one of the hydroxyl groups occurs in the alpha position, the PHA is a polyhydroxy alpha-hydroxy acid (AHA); when an additional sugar is attached to the PHA structure the molecule is a bionic acid. It is understood that lactobionic acid and its salts creates the potential for increased hydration due to its PHA bionic structure. The multiple hydroxyl groups in PHAs attract and hydrogen bond surrounding water molecules, which increase the humectant properties of the compounds. FIG. 6 is a graph that shows the weight (in grams) of water absorbed per mole of various substances. Of the nine different substances (plus the control), the lactobionic acid (LBA) provided the highest levels of water retention. The increase in water retention with a LBA agent is significantly higher than the median increase of all other substances reviewed. Thus, the variations in soil water retention observed between the different lactobionate salts are relatively small compared to the ability of these salts to increase water retention versus other non-lactobionate compounds.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a process" includes a plurality of such processes and reference to "the compound" includes reference to one or more compounds and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

What is claimed is:

1. A method of extending a period of increased soil nitrogen levels in a soil, the method comprising:
applying a soil enhancement agent to the soil, wherein the soil enhancement agent comprises one or both of (i) lactobionic acid and (ii) at least one salt of lactobionic acid, and wherein the soil enhancement agent comprises less than 1 dry wt. % proteins; and
applying a nitrogen-containing fertilizer to the soil,
wherein the soil treated with both the soil enhancement agent and the nitrogen-containing fertilizer has a higher level of soil nitrogen for at least a portion of a growing cycle of a plant-based crop planted in the soil than the same soil treated without the soil enhancement agent during the growing cycle of the plant-based crop.

2. The method of claim 1, wherein the at least one salt of the lactobionic acid comprises potassium lactobionate, calcium lactobionate, or ammonium lactobionate.

3. The method of claim 1, wherein the at least one salt of lactobionic acid comprises potassium lactobionate or calcium lactobionate.

4. The method of claim 1, wherein at least one salt of lactobionic acid comprises potassium lactobionate.

5. The method of claim 1, wherein the soil enhancement agent lacks at least one of ammonium-containing compounds, nitrate-containing compounds, and urea compounds.

6. The method of claim 1, wherein the at least one salt of lactobionic acid is derived from lactose obtained from one or more of milk, whey, milk permeate, or delactose permeate.

7. The method of claim 6, wherein the lactose is converted into lactobionic acid, and where the lactobionic acid is neutralized to form the at least one salt of the lactobionic acid.

8. The method of claim 1, wherein the soil enhancement agent further comprises water.

9. The method of claim 1, wherein the soil enhancement agent is applied to the soil in an amount ranging from 0.002% to 30% by weight of the soil.

10. The method of claim 1, wherein the nitrogen-containing fertilizer comprises at least one ammonium compound.

11. The method of claim 1, wherein the nitrogen-containing fertilizer comprises at least one nitrate compound.

12. The method of claim 1, wherein the nitrogen-containing fertilizer comprises at least one urea compound.

13. The method of claim 1, wherein the nitrogen-containing fertilizer is applied to the soil in an amount ranging from 1% to 30% by weight of the soil.

14. The method of claim 1, wherein the soil enhancement agent and the nitrogen-containing fertilizer are applied to the soil at the same time.

15. The method of claim 1, wherein the soil enhancement agent and the nitrogen-containing fertilizer are applied to the soil at different times.

16. A method of increasing soil water content during a growing cycle of a plant-based crop, the method comprising applying an aqueous soil enhancement agent to the soil at an application amount ranging from 50 gal/acre to 200 gal/acre to make a treated soil,
wherein the aqueous soil enhancement agent comprises water and at least one of (i) lactobionic acid and (ii) a salt of lactobionic acid, and wherein the soil enhancement agent comprises less than 1 dry wt. % proteins, and further wherein the treated soil has a higher water content for at least a portion of a growing cycle of a plant-based crop planted in the treated soil than untreated soil without the soil enhancement agent during the same portion of the growing cycle of the plant-based crop.

17. The method of claim 16, wherein the method further comprises:

applying a nitrogen-containing fertilizer to the soil.

18. The method of claim 16, wherein the salt of the lactobionic acid comprises potassium lactobionate, calcium lactobionate, or ammonium lactobionate.

19. The method of claim 16, wherein the salt of lactobionic acid comprises potassium lactobionate or calcium lactobionate.

20. The method of claim 10, wherein the aqueous soil enhancement agent consists essentially of aqueous potassium lactobionate.

\* \* \* \* \*